US010681309B2

(12) United States Patent
Adams et al.

(10) Patent No.: US 10,681,309 B2
(45) Date of Patent: Jun. 9, 2020

(54) DIRECTION DEPENDENT MCU/GATEWAY (71) Applicant: Polycom, Inc., San Jose, CA (US)

(72) Inventors: Jeffrey Adams, Lafayette, CO (US); Eric Nylander, Westminster, CO (US); Damian Diaz, Westminster, CO (US); Chad Alexander, Westminster, CO (US); Joanne Kubischta, Westminster, CO (US); George David, Westminster, CO (US); Matt Parker, Westminster, CO (US); Jozef Saniga, Bratislava (SK); Ryan Hermanson, Westminster, CO (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/939,501

(22) Filed: Mar. 29, 2018

(65) Prior Publication Data
US 2018/0288368 A1 Oct. 4, 2018

Related U.S. Application Data (60) Provisional application No. 62/479,142, filed on Mar. 30, 2017.

(51) Int. Cl.
*H04N 7/15* (2006.01)
*H04L 29/06* (2006.01)
*H04N 19/40* (2014.01)
*H04L 29/08* (2006.01)

(52) U.S. Cl.
CPC ........... *H04N 7/152* (2013.01); *H04L 65/403* (2013.01); *H04L 65/605* (2013.01); *H04L 67/2823* (2013.01); *H04N 19/40* (2014.11); *H04L 65/608* (2013.01); *H04L 69/08* (2013.01)

(58) Field of Classification Search
CPC combination set(s) only.
See application file for complete search history.

(56) References Cited

U.S. PATENT DOCUMENTS

| 2012/0287229 A1* | 11/2012 | Yang ................... H04L 12/1813 348/14.09 |
| 2013/0210401 A1* | 8/2013 | Knaz ....................... H04M 3/56 455/416 |
| 2013/0328998 A1* | 12/2013 | Duckworth ............. G06F 3/147 348/14.07 |
| 2014/0082416 A1* | 3/2014 | Mishra .................. H04M 3/567 714/18 |

(Continued)

*Primary Examiner* — Phung-Hoang J Nguyen
(74) *Attorney, Agent, or Firm* — Blank Rome, LLP (57) ABSTRACT

A non-Skype multipoint control unit (MCU) is configured to operate differently for handling incoming streams from endpoints and outgoing streams from a Skype multipoint control unit. When passing incoming streams from non-Skype endpoints to a Skype conference, the non-Skype MCU acts as a gateway, passing the streams to Skype MCU as if they were coming from Skype endpoints. When receiving outgoing streams from Skype MCU, the non-Skype MCU acts as an MCU, transcoding, compositing, and scaling streams into continuous presence layouts for delivery to the non-Skype endpoints. Thus, non-Skype endpoints can participate in Skype conferences as if they were Skype endpoints, allowing a better user experience for both Skype endpoints and non-Skype endpoints.

17 Claims, 4 Drawing Sheets

(56) References Cited

U.S. PATENT DOCUMENTS

| | | | | |
|---|---|---|---|---|
| 2015/0326825 A1* | 11/2015 | Bebbington | ......... | H04N 19/139 348/14.09 |
| 2016/0173823 A1* | 6/2016 | Duckworth | ............ | H04N 7/142 348/14.07 |
| 2018/0041273 A1* | 2/2018 | Chiang | ................ | H04B 10/116 |

* cited by examiner

DIRECTION DEPENDENT MCU/GATEWAY

TECHNICAL FIELD

The present invention relates to the field of videoconferencing, and in particular to a technique for integrating conferencing systems of two different types.

BACKGROUND ART

Enterprises can schedule online conferences using Skype® For Business (formerly known as Lync®) services. (LYNC and SKYPE are registered trademarks of Microsoft Corp.) Some non-Skype videoconferencing systems can connect non-Skype videoconferences with Skype video conferences, but the connection has had limitations. Both Skype endpoints and non-Skype endpoints see content and video from endpoints of the other type as a cascaded videoconference in which the endpoints of the non-Skype videoconference appear in a single segment of a Skype screen layout and endpoints of the Skype videoconference appear in a single segment of a non-Skype screen layout, with a single stream passing between the Skype system and the non-Skype system. This presents a less than optimal user experience.

A better approach to integrating Skype conferences and non-Skype conferences would be desirable.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein, the term "stream" can encompass one or more physical streams that are logically associated with each other flowing in a single direction. For example, a stream may include audio, video, and content streams that form a single multifaceted media presence of a device.

Although described herein as a technique for connecting between a Skype conference and non-Skype endpoints, the techniques described below are not so limited, and similar techniques can be used to allow endpoints associated with one type conferencing system to connect to a conference of another type of conferencing system.

As disclosed herein, the user uses the Microsoft Skype software as the user is accustomed to use it, without any plugins. A user typically schedules an online meeting using the Microsoft Outlook® email software's built-in Skype meeting button. (OUTLOOK is a registered trademark of Microsoft Corporation.) Skype users can join the meeting by clicking the hyperlink they receive in the invitation and be connected to the Microsoft Skype multipoint control unit (MCU), sometimes referred to as an audio video MCU (AVMCU). All that is standard Microsoft flow. Participants with video or audio equipment that cannot dial in to Skype MCU (referred to herein as a non-Skype endpoint) can dial the conference ID that was sent with the meeting invitation and join a conference on a non-Skype MCU. The non-Skype MCU and a call server enable dialing into Skype MCU to join the Skype conference. Both Skype endpoints and non-Skype endpoints may see a continuous presence of endpoints that may include Skype endpoints and non-Skype endpoints, as determined by Skype MCU. Thus, both integration between Skype and non-Skype conferencing systems is provided without requiring installation of a plugin in the non-Skype endpoints.

Figure 1:
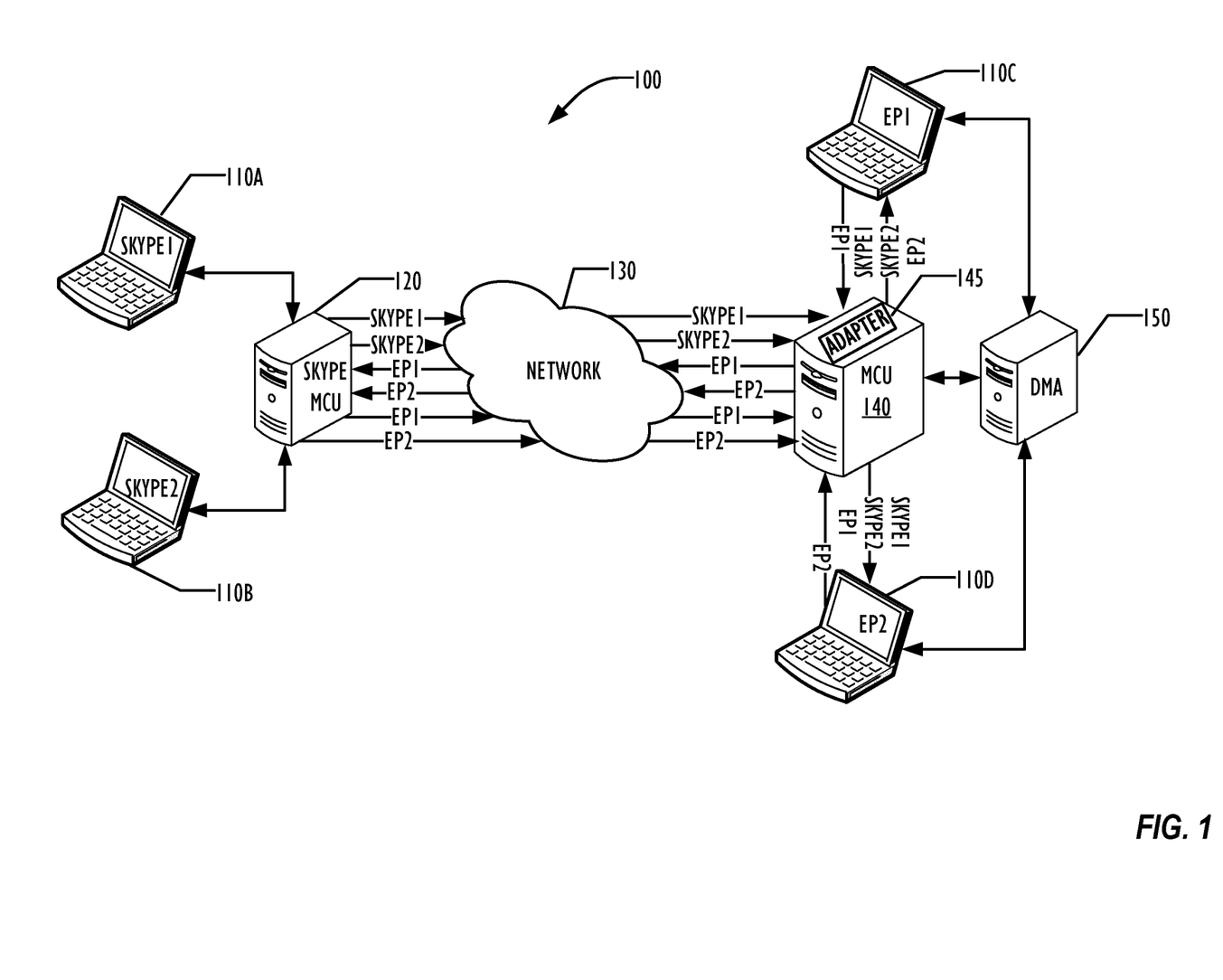
FIG. 1 is a schematic diagram illustrating a system for integrating a Skype endpoint and non-Skype endpoints into an integrated conference according to one embodiment.

FIG. 1 illustrates a system 100 for allowing non-Skype endpoints to connect to a Skype conference according to one embodiment. Although the endpoints 110 are illustrated in the FIG. 1 as laptop computers, they can be any type of programmable device capable of participating in an audio or video conference, including desktop computers, telephones, and mobile devices such as smart phones or tablets. The examples of the Figures are not intended to imply that only those elements shown in the Figures are present. One of skill in the art will also recognize that a Skype system may employ other devices that provide functionality to the Skype system. Similarly, the non-Skype systems illustrated in the Figures may employ other devices than are illustrated in the Figures to provide functionality to the non-Skype system.

A non-Skype call server 150, such as a DMA® call server provided by Polycom, Inc. provides a dial rule using an identification such as "Dial by Skype conference ID." (DMA is a registered trademark of Polycom, Inc.) Endpoints 110C and 110D do not need to support the Skype protocol and may be registered to the call server 150, using Session Initiation Protocol (SIP), H.323, or any other Media IP protocol. Details of one embodiment for allowing the non-Skype endpoints 110C and 110D to dial in to the conference managed by Skype MCU 120 can be found in U.S. Pat. Pub. No. 20160269687, "Integration of Scheduled Meetings with Audio-Video Solutions," U.S. application Ser. No. 15/066, 498, published Mar. 10, 2016, which is incorporated by reference in its entirety for all purposes. Other techniques may be used to allow non-Skype endpoints to dial in to Skype conferences.

In one embodiment, non-Skype video participants can see one or more Skype participants in a continuous presence layout. Likewise, Skype participants may be able to see a presentation of one or more non-Skype participants. As used herein, a Skype participant refers to an endpoint, such as endpoints 110A and 110B of FIG. 1, that is capable of connecting to Skype MCU 120 using native protocols. The maximum number of Skype participants that are visible at any time may be constrained by limitations in Skype MCU 120. In some embodiments, the maximum number of active Skype participants visible to Skype conference participants may be a predetermined number, such as 5.

Now, assume that endpoints 110C and 110D are dialed in to the Skype conference managed by Skype MCU 120, which also has Skype endpoints 110A and 110B in the conference. For outgoing streams, MCU 140 acts as a gateway between the endpoints 110C and 110D and the Skype conference. Because Skype MCU 120 may employ different protocols than may be used by MCU 140, an adapter 145 may be used to translate between protocols, allowing streams EP1 and EP2 from endpoints 110C and 110D, respectively, to be sent across network 130 to Skype MCU 120 as Skype streams. Streams EP1 or EP2 may be media streams, such as video, content streams, or combined media and content streams.

Upon receipt by Skype MCU 120, the EP1 and EP2 streams are processed by Skype MCU 120 and may be sent to Skype endpoints 110A and 110B, as well as back to non-Skype endpoints 110C and 110D. Skype MCU 120 determines which streams should be displayed to the participants of the Skype conference, using any desired technique, such as streams corresponding to active speakers.

In the example scenario of FIG. 1, there are fewer endpoints in the conference than the Skype stream limit, thus Skype MCU 120 may send streams corresponding to all participants to each participant in the conference, including the non-Skype endpoints 110C and 110D. In conferences with greater than a Skype MCU 120—determined limit of endpoints, Skype MCU 120 may only send as many streams as correspond to the limit. In this embodiment, Skype MCU does not deliver a composite continuous presence stream, but delivers separate streams corresponding to each participant in the conference.

In FIG. 1, Skype MCU 120 sends back to MCU 140 streams Skype1 and Skype2, corresponding to the streams of Skype endpoints 110A and 110B, respectively, as well as streams EP1 and EP2, corresponding to endpoints 110C and 110D. MCU 140 may then compose the streams into a composite continuous presence stream according to a continuous presence layout and deliver the composite continuous presence stream to endpoints 110C and 110D.

In the example scenario of FIG. 1, the composite stream for endpoint 110C contains segments of streams Skype1, Skype2, and EP2, while the composite stream for endpoints 110D contains streams Skype1, Skype2, and EP1. Endpoints 110C and 110D may then display the composite streams on their respective displays, using any predefined layout for the segments, such as in a 2×2 configuration commonly known as a "Hollywood Squares" layout. The layout provided to endpoint 110C may differ from the layout provided to endpoint 110D in some embodiments. As necessary, adapter 145 may assist in performing necessary translations from Skype protocols and streams to non-Skype protocols and streams to accomplish this.

In some embodiments, MCU 140 may act as a media relay MCU and instead of composing streams received from Skype MCU 120 into a composite continuous presence stream, may relay the separate streams to one or more non-Skype endpoints such as endpoints 110C and 110D, along with layout-related information, allowing each endpoint to build composite images from the relayed streams.

Thus, instead of flowing from endpoint 110C through MCU 140 to endpoint 110D, the stream EP1 from endpoint 110C may traverse MCU 140, network 130, and Skype MCU 120, returning via network 130 and MCU 140 before being directed to endpoint 110D. MCU 140 is direction dependent in that it passes outgoing streams to Skype MCU 120 just as a gateway to the Skype conference, while it processes incoming streams from Skype MCU 120 as an MCU, determining how to present the incoming streams to endpoints 110C and 110D.

Although illustrated in FIG. 1 with both endpoints 110C and 110D connected to a single MCU 140, multiple MCUs 140 may be deployed, with endpoint 110C connected to a first MCU 140 and endpoint 110D connected to a second MCU 140, both of which independently communicate with Skype MCU 120. To Skype MCU 120, MCU 140 (whether a single MCU or multiple MCUs) is effectively invisible and Skype MCU 120 acts as if it communicates directly with each non-Skype endpoint 110C and 110D, treating them as if they were Skype endpoints. For example, MCU 140 may choose to exclude some Skype conference participants from the composite layout that is presented to endpoints 110C or 110D, based on criteria defined by MCU 140. In some embodiments, Skype MCU 120 may be unable to detect that non-Skype endpoints are connected to the conference.

Endpoints 110C and 110D are illustrated in FIG. 1 as if they were directly connected to MCU 140. In practice, endpoints 110C and 110D are typically connected to MCU 140 via the Internet or one or more other interconnected networks not shown in FIG. 1. Although the adapter 145 is illustrated as being part of MCU 140, it may be implemented in a separate environment, such as in a separate hardware device or separate software environment. Adapting signaling from one protocol to another, such as from SIP to non-SIP protocols or between two SIP variants, is well known in the art and needs no further description herein.

MCU 140 may provide transcoding, compositing, and scaling when acting as an MCU on the incoming streams received from Skype MCU 120. Transcoding, compositing, and scaling are well known in the art and need no further description herein.

Figure 2:
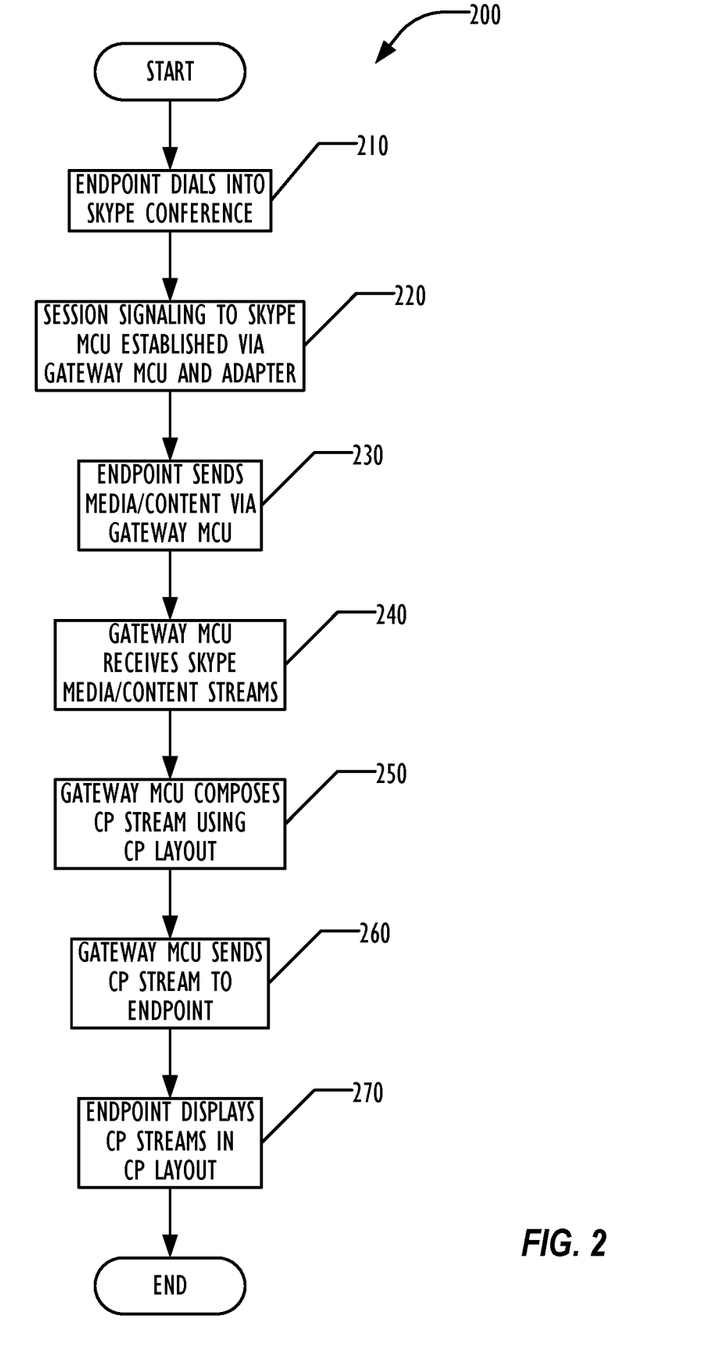
FIG. 2 is a flowchart illustrating a technique for connecting non-Skype endpoints into a Skype conference system according to one embodiment.

FIG. 2 is a flowchart 200 illustrating a process for integrating non-Skype endpoints 110 into a Skype conference using a direction dependent MCU 140 as described above, according to one embodiment. In block 210, the endpoint 110 dials into the Skype conference, typically with the assistance of DMA 150 as described in U.S. Pat. Pub. No. 20160269687, "Integration of Scheduled Meetings with Audio-Video Solutions," U.S. application Ser. No. 15/066,498, published Mar. 10, 2016, which is incorporated herein by reference in its entirety for all purposes. Once the call setup has been accomplished, in block 220 the session signaling described generally above is performed by MCU 140 and if necessary, adapter 145, allowing streams to be configured between Skype MCU 120 and MCU 140. In block 230, the endpoint 110 sends media and/or content streams to the Skype conference, using MCU 140 as a gateway to Skype MCU 120.

In block 240, MCU 140 receives streams from Skype MCU 120, such as streams Skype1, Skype2, EP1, and EP2 as described above. If MCU 140 is acting as a non-relay MCU, MCU 140 in block 250 transcodes, composes, and scales the incoming streams as necessary for each endpoint 110 connected to the conference, then sends the composite stream to each endpoint in block 260. Each endpoint 110 may then, in block 270, display the composite stream in a continuous presence layout as defined for that endpoint 110. Where MCU 140 acts as a relay MCU, the separate streams may be relayed to the endpoints 110 for transcoding, compositing, and scaling at the endpoints 110.

In a further embodiment, integration of Skype and non-Skype endpoints into a Skype conference can make use of Skype federated system techniques, using a Skype conference auto-attendant (CAA) as an intermediary to allow connecting the endpoints to the Skype conference and passing streams inside the Skype federated system, but otherwise appearing to MCU 140 and endpoints 110C and 110D as if they were connected to Skype MCU 120 as illustrated in FIG. 1. In similar embodiments, in which Skype MCUs are hosted in the cloud, instead of at a customer site, the cloud Skype MCUs may also be reached using a CAA as an intermediary as described above.

Figure 3:
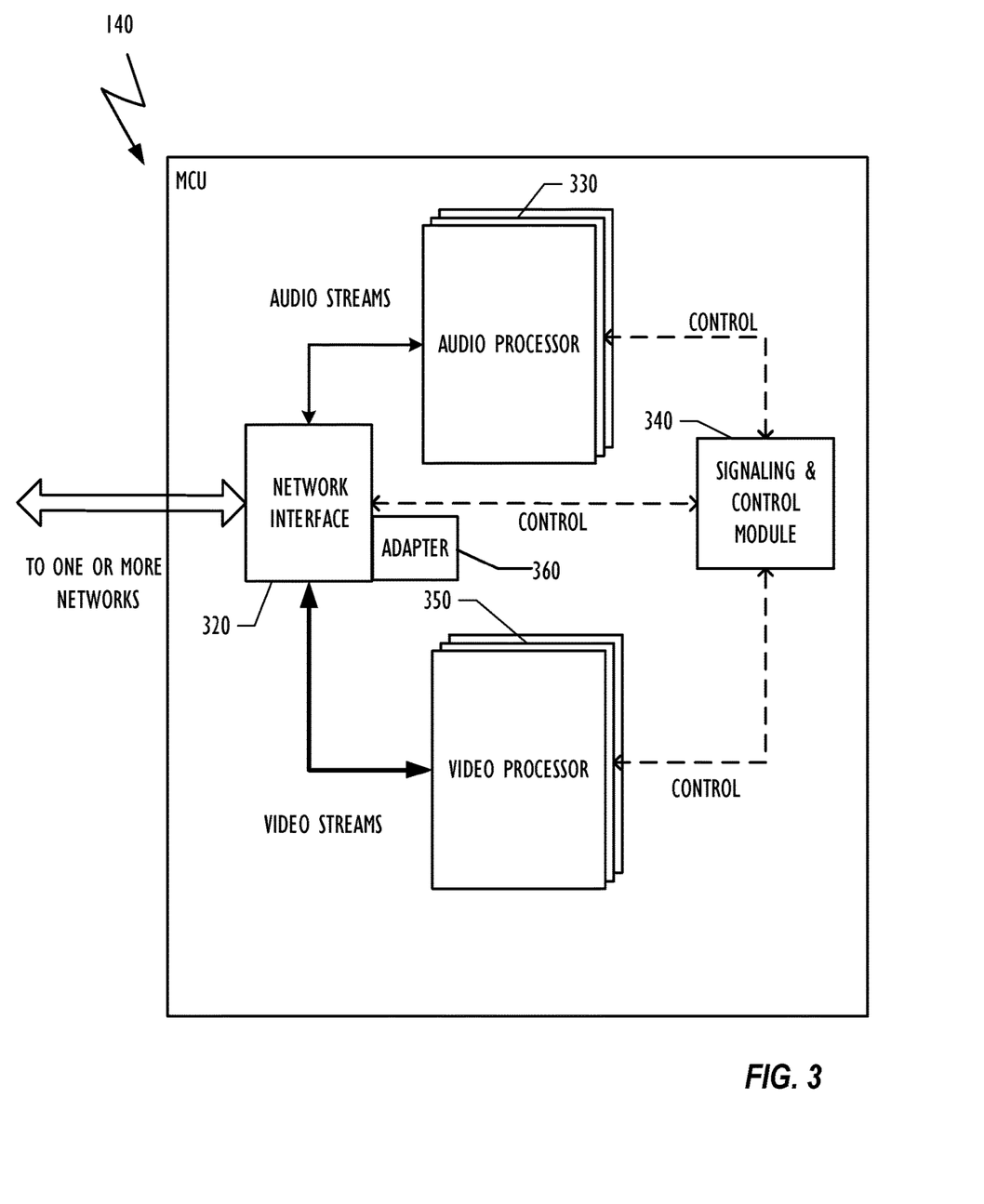
FIG. 3 is a block diagram illustrating a multipoint control unit for use in one embodiment.

FIG. 3 is a block diagram illustrating some relevant components of a non-Skype MCU 140 according to one embodiment. A network interface 320 provides connectivity between MCU 140 and networks such as the network 130. One or more audio processors 330 process audio streams received over the network interface 320 and audio streams transmitted from MCU 140 over the network interface 320. One or more video processors 350 process video streams received and transmitted via the network interface 320. A signaling and control module 340 provides control functionality for MCU 140, including handling of dial-out and dial-in functionality that may be used for setting up conferences with endpoints 110 or integrating non-Skype endpoints 110 with Skype conferences hosted by Skype MCU 120. Memory connected to signaling and control module 340 may store software then when executed by signaling and control module cause the multipoint control unit 140 to perform the techniques described herein.

Adapter 360 may be a component of MCU 140, corresponding to the adapter 145 of FIG. 1, and performing the signaling translation needed to communicate between Skype MCU 120 and MCU 140.

One of skill in the art will recognize that other elements or components of an MCU that are not illustrated for clarity in FIG. 3 may be deployed in MCU 140 as desired, and that the arrangement and connectivity of FIG. 3 is illustrative and by way of example only. The signaling and control module typically includes one or more processing units that execute instructions stored in a memory, such as a storage device or random access memory, that when executed cause MCU 140 to perform its function.

Figure 4:
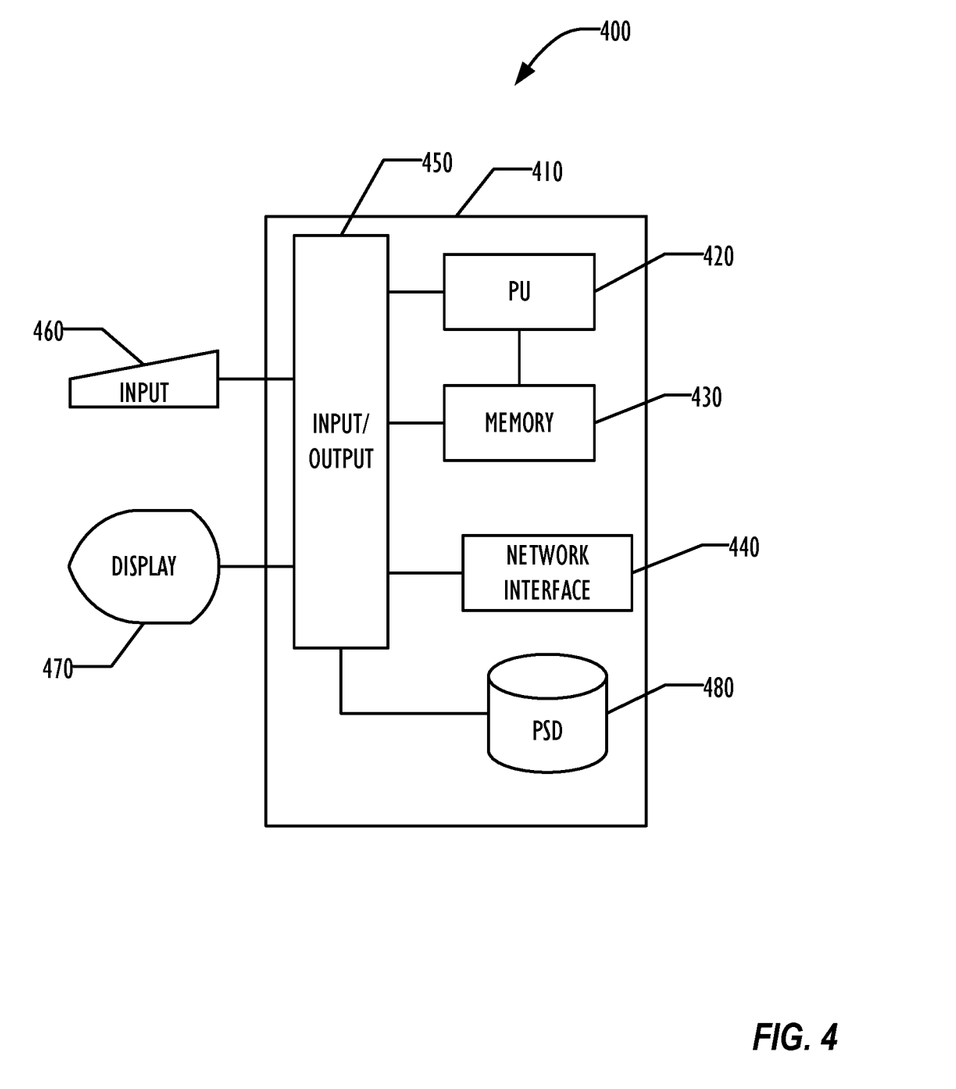
FIG. 4 is a block diagram of a programmable device for use in one embodiment.

FIG. 4 is a block diagram of a programmable device 400 that may be employed as a call server 150 or an endpoint 110 according to one embodiment. Example programmable device 400 comprises a system unit 410 which may be optionally connected to an input device or system 460 (e.g., keyboard, mouse, touch screen, etc.) and display 470. A program storage device (PSD) 480 (sometimes referred to as a hard disc) is included with the system unit 410. Also included with system unit 410 is a network interface 440 for communication via a network with other computing and networking devices (not shown). System unit 410 is be communicatively coupled to network interface 440. Program storage device 480 represents any form of non-volatile storage including, but not limited to, all forms of optical and magnetic, including solid-state, storage elements, including removable media, and may be included within system unit 410 or be external to system unit 410. Program storage device 480 may be used for storage of software to control system unit 410, data for use by the programmable device 400, or both.

System unit 410 may be programmed to perform methods in accordance with this disclosure. System unit 410 comprises a processing element (PU) 420, input-output (I/O) interface 450 and memory 430. Processing element 420 may include any programmable controller device including one or more members of the processor families in common use in computers, including multi-core processors. Memory 430 may include one or more memory modules and comprise any type of memory, including, but not limited to, random access memory (RAM), read only memory (ROM), programmable read only memory (PROM), programmable read-write memory, and solid-state memory. One of ordinary skill in the art will also recognize that PU 420 may also include some internal memory including, for example, cache memory. The program storage device 480 has stored on it instructions that when executed cause the programmable device 400 to perform its function.

Because prior approaches to integrating non-Skype endpoints into a Skype conference resulted in cascading a conference hosted on the non-Skype MCU 140 to a conference hosted on Skype MCU 120, participant in the cascaded conference could not be separately controlled by Skype MCU 120. Advantageously in embodiments described above, each non-Skype participant appears individually in the Skype roster, and can be separately controlled, allowing the participant to be muted, unmuted, promoted to presenter, disconnected, etc. Similarly, each participant may send control signals to Skype MCU 120 as if they were a normal Skype participant in the conference.

Embodiments may be implemented in one or a combination of hardware, firmware, and software. Embodiments may also be implemented as instructions stored on a machine readable storage medium, which may be read and executed by at least one processing element to perform the operations described herein. A machine readable storage medium may include any non-transitory mechanism for storing information in a form readable by a machine (e.g., a computer). For example, a machine readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A conferencing method for connecting endpoints of a first type to a conference of a second type, wherein conferences of the first type use a first conferencing protocol and conferences of the second type use a second conferencing protocol, wherein the first conferencing protocol has an endpoint providing one stream to a multipoint control unit and receiving one stream from the multipoint control unit, regardless of the number of endpoints in the conference, and wherein the second conferencing protocol has an endpoint providing one stream to the multipoint control unit and receiving a plurality of streams from the multipoint control unit, with each stream received being for a single endpoint in the conference, the conferencing method comprising:

receiving instructions from a first endpoint and from a second endpoint configured for conferences of the first type to join a conference of the second type;

connecting the first endpoint and the second endpoint to the conference via a first multipoint control unit configured for conferences of the first type;

gatewaying a stream received by the first multipoint control unit from the first endpoint to a second multipoint control unit controlling the conference and gatewaying a stream received by the first multipoint control unit from the second endpoint to the second multipoint control unit, wherein the second multipoint control unit is configured for conferences of the second type, such that the first multipoint control unit is providing a stream for the first endpoint and a stream for the second endpoint to the second multipoint control unit;

processing a plurality of conference streams received by the first multipoint control unit from the second multipoint control unit, wherein the plurality of conference streams includes individual streams for endpoints configured for conferences of the second type connected to the second multipoint control unit; and delivering one stream corresponding to the plurality of conference streams to the first endpoint and one stream corresponding to the plurality of conference streams to the second endpoint, wherein the first endpoint and the second endpoint do not support the second conferencing protocol.

2. The method of claim 1, wherein the first endpoint appears to the second multipoint control unit as an individual participant of the conference, separate from any other endpoints connected to the conference via the first multipoint control unit, and wherein the second endpoint appears to the second multipoint control unit as an individual participant of the conference, separate from any other endpoints connected to the conference via the first multipoint control unit.

3. The method of claim 1, further comprising:

converting signaling for the first endpoint and the second endpoint to a protocol supported by the second multipoint control unit.

4. The method of claim 1, wherein processing the plurality of conference streams comprises:

transcoding and scaling the plurality of conference streams received by the first multipoint control unit from the second multipoint control unit for delivery to the first endpoint and to the second endpoint; and compositing the transcoded and scaled plurality of conference streams received by the first multipoint control unit from the second multipoint control unit into a first composite continuous presence stream according to a continuous presence layout corresponding to the first endpoint and a second composite continuous presence stream according to a continuous presence layout corresponding to the second endpoint.

5. The method of claim 1,
wherein the plurality of conference streams received by the first multipoint control unit from the second multipoint control unit comprises a stream corresponding to the first endpoint and a stream corresponding to the second endpoint.

6. The method of claim 1, wherein gatewaying the stream received by the first multipoint control unit from the first endpoint comprises transforming the stream received from the first endpoint into a stream for a conference of the second type such that the first endpoint appears to the second multipoint control unit as an endpoint configured for conferences of the second type, and
wherein gatewaying the stream received by the first multipoint control unit from the second endpoint comprises transforming the stream received from the second endpoint into a stream for a conference of the second type such that the second endpoint appears to the second multipoint control unit as an endpoint configured for conferences of the second type.

7. A machine readable medium on which is stored software for connecting endpoints of a first type to a conference of a second type, wherein conferences of the first type use a first conferencing protocol and conferences of the second type use a second conferencing protocol, wherein the first conferencing protocol has an endpoint providing one stream to a multipoint control unit and receiving one stream from the multipoint control unit, regardless of the number of endpoints in the conference, and wherein the second conferencing protocol has an endpoint providing one stream to the multipoint control unit and receiving a plurality of streams from the multipoint control unit, with each stream received being for a single endpoint in the conference, the software comprising instructions that when executed by a first multipoint control unit configured for conferences of the first type cause the first multipoint control unit to:
receive instructions from a first endpoint and from a second endpoint configured for conferences of the first type to join a conference of the second type;
connect the first endpoint and the second endpoint to the conference via a second multipoint control unit of the second type controlling the conference, wherein the second multipoint control unit is configured for conferences of the second type;
gateway a stream received by the first multipoint control unit from the first endpoint to the second multipoint control unit and gateway a stream received by the first multipoint control unit from the second endpoint to the second multipoint control unit, such that the first multipoint control unit is providing a stream for the first endpoint and a stream for the second endpoint to the second multipoint control unit;
process a plurality of conference streams received from the second multipoint control unit, wherein the plurality of conference streams includes individual streams for endpoints configured for conferences of the second type connected to the second multipoint control unit; and
deliver one stream corresponding to the plurality of conference streams to the first endpoint and one stream corresponding to the plurality of conference streams to the second endpoint,
wherein the first endpoint and the second endpoint do not support the second conferencing protocol.

8. The machine readable medium of claim 7, wherein the first endpoint appears to the second multipoint control unit as an individual participant of the conference, separate from any other endpoints connected to the conference via the first multipoint control unit, and
wherein the second endpoint appears to the second multipoint control unit as an individual participant of the conference, separate from any other endpoints connected to the conference via the first multipoint control unit.

9. The machine readable medium of claim 7, wherein the software further comprises instructions that when executed by the first multipoint control unit causes the first multipoint control unit to:
convert signaling for the first endpoint and the second endpoint to a protocol supported by the second multipoint control unit.

10. The machine readable medium of claim 7, wherein the instructions that when executed by the first multipoint control unit cause the first multipoint control unit to process the plurality of conference streams comprise instructions that when executed by the first multipoint control unit cause the first multipoint control unit to:
transcode and scale the plurality of conference streams received by the first multipoint control unit from the second multipoint control unit for delivery to the first endpoint and to the second endpoint; and
composite the transcoded and scaled plurality of conference streams received by the first multipoint control unit from the second multipoint control unit into a first composite continuous presence stream according to a continuous presence layout corresponding to the first endpoint and a second composite continuous presence stream according to a continuous presence layout corresponding to the second endpoint.

11. The machine readable medium of claim 7,
wherein the plurality of conference streams received by the first multipoint control unit from the second multipoint control unit comprises a stream corresponding to the first endpoint and a stream corresponding to the second endpoint.

12. The machine readable medium of claim 7, wherein the instructions that when executed by the first multipoint control unit cause the first multipoint control unit to gateway the stream received by the first multipoint control unit from the first endpoint comprise instructions that when executed by the first multipoint control unit causes the first multipoint control unit to transform the stream received from the first endpoint into a stream for a conference of the second type such that the first endpoint appears to the second multipoint control unit as an endpoint configured for conferences of the second type, and
wherein the instructions that when executed by the first multipoint control unit cause the first multipoint control unit to gateway the stream received by the first multipoint control unit from the second endpoint comprise instructions that when executed by the first multipoint control unit causes the first multipoint control unit to transform the stream received from the second endpoint into a stream for a conference of the second type such that the second endpoint appears to the second multipoint control unit as an endpoint configured for conferences of the second type.

13. A multipoint control unit configured for conferences of a first type configured for connecting endpoints configured for conferences of the first type to a conference of a second type, wherein conferences of the first type use a first conferencing protocol and conferences of the second type use a second conferencing protocol, wherein the first conferencing protocol has an endpoint providing one stream to a multipoint control unit and receiving one stream from the multipoint control unit, regardless of the number of endpoints in the conference, and wherein the second conferencing protocol has an endpoint providing one stream to the multipoint control unit and receiving a plurality of streams from the multipoint control unit, with each stream received being for a single endpoint in the conference, the multipoint control unit comprising:

a signaling and control module; and a memory, connected to the signaling and control module storing software that comprises instructions that when executed by the signaling and control module cause the multipoint control unit of the first type to:

receive instructions from a first endpoint and from a second endpoint configured for conferences of the first type to join a conference of the second type;

connect the first endpoint and the second endpoint to the conference via a second multipoint control unit controlling the conference, wherein the second multipoint control unit is configured for conferences of the second type;

gateway a stream received from the first endpoint to the second multipoint control unit and gateway a stream received from the second endpoint to the second multipoint control unit, such that the first multipoint control unit is providing a stream for the first endpoint and a stream for the second endpoint to the second multipoint control unit;

process a plurality of conference streams received from the second multipoint control unit, wherein the plurality of conference streams includes independent streams for endpoints configured for conferences of the second type connected to the second multipoint control unit; and deliver one stream corresponding to the plurality of conference streams to the first endpoint and one stream corresponding to the plurality of conference streams to the second endpoint, wherein the first endpoint and the second endpoint do not support the second conferencing protocol.

14. The multipoint control unit configured for conferences of the first type of claim 13, wherein the first endpoint appears to the second multipoint control unit as an individual participant of the conference, separate from any other endpoints connected to the conference via the multipoint control unit configured for conferences of the first type, and wherein the second endpoint appears to the second multipoint control unit as an individual participant of the conference, separate from any other endpoints connected to the conference via the first multipoint control unit.

15. The multipoint control unit configured for conferences of the first type of claim 13, wherein the instructions that when executed by the signaling and control module cause the multipoint control unit configured for conferences of the first type to process the plurality of conference streams comprise instructions that when executed by the signaling and control module cause the multipoint control unit configured for conferences of the first type to:

transcode and scale the plurality of conference streams received by the multipoint control unit configured for conferences of the first type from the second multipoint control unit for delivery to the first endpoint and to the second endpoint; and composite the transcoded and scaled plurality of conference streams received by the multipoint control unit configured for conferences of the first type from the second multipoint control unit into a first composite continuous presence stream according to a continuous presence layout corresponding to the first endpoint and a second composite continuous presence stream according to a continuous presence layout corresponding to the second endpoint.

16. The multipoint control unit configured for conferences of the first type of claim 13, wherein the plurality of conference streams received by the multipoint control unit configured for conferences of the first type from the second multipoint control unit comprises a stream corresponding to the first endpoint and a stream corresponding to the second endpoint.

17. The multipoint control unit configured for conferences of the first type of claim 13, wherein the instructions that when executed by the signaling and control module cause the multipoint control unit configured for conferences of the first type to gateway the stream received by the multipoint control unit configured for conferences of the first type from the first endpoint comprise instructions that when executed by the signaling and control module causes the multipoint control unit configured for conferences of the first type to transform the stream received from the first endpoint into a stream for a conference of the second type such that the first endpoint appears to the second multipoint control unit as an endpoint configured for conferences of the second type, and wherein the instructions that when executed by the signaling and control module cause the multipoint control unit configured for conferences of the first type to gateway the stream received by the multipoint control unit configured for conferences of the first type from the second endpoint comprise instructions that when executed by the signaling and control module causes the multipoint control unit configured for conferences of the first type to transform the stream received from the second endpoint into a stream for a conference of the second type such that the second endpoint appears to the second multipoint control unit as an endpoint configured for conferences of the second type.

* * * * *